(12) United States Patent
Choi et al.

(10) Patent No.: US 8,017,051 B2
(45) Date of Patent: Sep. 13, 2011

(54) PROCESS FOR PRODUCING ACRYLIC ARTIFICIAL MARBLE HAVING NATURAL PATTERN

(75) Inventors: Sung Mook Choi, Chunla-namdo (KR); Dong Choon Chung, Chunla-namdo (KR)

(73) Assignee: Cheil Industries Inc., Kyungbuk (KR)

( * ) Notice: Subject to any disclaimer, the term of this patent is extended or adjusted under 35 U.S.C. 154(b) by 627 days.

(21) Appl. No.: 10/743,056

(22) Filed: Dec. 23, 2003

(65) Prior Publication Data
US 2004/0137171 A1    Jul. 15, 2004

(30) Foreign Application Priority Data
Dec. 26, 2002  (KR) .................. 10-2002-0084060

(51) Int. Cl.
B29C 69/00 (2006.01)
B29C 41/22 (2006.01)
B29C 47/00 (2006.01)
A01N 1/00 (2006.01)

(52) U.S. Cl. ............... 264/73; 264/70; 264/74; 264/75; 264/212; 264/245; 428/15

(58) Field of Classification Search .............. 264/70, 264/73, 74, 75, 212, 245
See application file for complete search history.

(56) References Cited

U.S. PATENT DOCUMENTS

| | | | | |
|---|---|---|---|---|
| 3,488,246 A | * | 1/1970 | Duggins | 428/15 |
| 3,570,056 A | * | 3/1971 | Hall et al. | 425/86 |
| 3,923,941 A | * | 12/1975 | Weaver | 264/73 |
| 4,085,246 A | * | 4/1978 | Buser et al. | 428/220 |
| 4,710,333 A | * | 12/1987 | Murakami et al. | 264/73 |
| 4,791,184 A | * | 12/1988 | Nagai et al. | 526/323.2 |
| 5,820,799 A | * | 10/1998 | Barnett | 264/73 |
| 5,837,175 A |   | 11/1998 | Mukai et al. | 264/73 |

FOREIGN PATENT DOCUMENTS

| | | |
|---|---|---|
| JP | 10-323848 | 12/1998 |
| JP | 11-29 1267 | 10/1999 |
| JP | 11-277552 | 10/1999 |
| JP | 11-291268 | 10/1999 |

OTHER PUBLICATIONS

Abstract of Japanese Patent Laid-open No. 10-323848, Dec. 9, 1998.
Abstract of Japanese Patent Laid-open No. 11-277552, Oct. 12, 1999.
Abstract of Japanese Patent Laid-open No. 11-29 1267, Oct. 25, 1999.
Abstract of Japanese Patent Laid-open No. 11-291268, Oct. 26, 1999.

* cited by examiner

*Primary Examiner* — Christina Johnson
*Assistant Examiner* — Atul Khare
(74) *Attorney, Agent, or Firm* — Law Offices of John A. Parrish

(57) ABSTRACT

The artificial marble with good natural pattern and color in accordance with the present invention is prepared mixing ununiformly at least two liquid resins through a line mixer 1, feeding the ununiformly mixed resin on a moving steel belt 4 at a constant speed through a flexible hose 2 and an exit nozzle 3, and reciprocating the exit nozzle perpendicularly to the steel belt by a predetermined program for the exit nozzle to stop at different positions for different durations. The line mixer used in this invention is a Kenics type and has inner elements of eight or less than eight. A line mixer with four to eight elements can be more preferably used.

1 Claim, 2 Drawing Sheets

PROCESS FOR PRODUCING ACRYLIC ARTIFICIAL MARBLE HAVING NATURAL PATTERN

FIELD OF THE INVENTION

The present invention relates to an artificial marble of acrylic resin having irregular pattern and color like a natural appearance. More particularly, the present invention relates to a process for preparing acrylic artificial marble having natural pattern and color, which comprises mixing ununiformly at least two liquid resins through a line mixer, and discharging the ununiformly mixed resin on a moving steel belt through an exit nozzle which is reciprocated perpendicularly to the steel belt by a predetermined program.

BACKGROUND OF THE INVENTION

In general, artificial marble is used as a material for kitchen furniture, plastic bath, tables, interior articles, etc, because it has many advantages in beautiful pattern and color, good processability, and lighter weight compared with natural marble.

The acrylic artificial marble is prepared with a mold by injecting a resin mixture and then curing the injected resin. The resin mixture is prepared by adding additives of a filler such as aluminum hydroxide, magnesium hydroxide and calcium hydroxide, pigments, curing agents, initiating agents, releasing agents, dispersing agents, etc to a resin syrup of methyl methacrylate (MMA) and polymethyl methacrylate (PMMA).

The most important technical feature for preparing artificial marble is to provide natural pattern and color thereon. Accordingly, intensive research and efforts have been made to achieve the purpose in the field of artificial marble industry.

U.S. Pat. No. 5,837,175 discloses a process for producing artificial marble by curing liquid resins in a molding cell, which comprises a step in which liquid resins each having different color are laminated by injection in the molding cell and a comb-like tool is moved in the liquid resins laminated while the blades of the tool are in contact with the bottom of the molding cell.

Japanese Patent Laid-open Nos. 10-323848 and 11-277552 disclose a process for preparing an artificial marble with natural pattern and color by laminating at least one resin layer with different color on a liquid resin layer ununiformly dispersed with pigments, and using a comb-like tool with different needles and gaps.

Japanese Patent Laid-open No. 11-291267 discloses a process for preparing an artificial marble with natural pattern and color by using a comb-like tool with a means for dispersing liquid resin.

Further, Japanese Patent Laid-open No. 1-291268 discloses an apparatus for preparing an artificial marble with natural pattern and color, which comprises a moving mold cell, a means for feeding liquid resin, and a comb-like tool, wherein the means for feeding liquid resin are equipped with two exit nozzles and a mixer for mixing liquid resin and pigments without agitation.

However, the above-mentioned patent applications provide with artificial marbles with stripe pattern but not good natural pattern and color.

Accordingly, the present inventors have developed a new process for producing artificial marble with natural pattern and color to overcome the shortcomings of the prior artificial marbles.

OBJECTS OF THE INVENTION

An object of the present invention is to provide an artificial marble with good natural pattern and color compared with conventional artificial marbles.

Another object of the present invention is to provide a process for producing an artificial marble with good natural pattern and color.

A further object of the present invention is to provide a process for producing an artificial marble with good natural pattern and color, which uses a predetermined program.

Further objects and advantages of the invention can be more fully understood from the following detailed description taken in conjunction with the accompanying drawings.

SUMMARY OF THE INVENTION

The artificial marble with good natural pattern and color in accordance with the present invention is prepared mixing ununiformly at least two liquid resins through a line mixer 1, discharging the ununiformly mixed resin on a moving steel belt 4 at a constant speed through a flexible hose 2 and an exit nozzle 3, and reciprocating the exit nozzle perpendicularly to the steel belt by a predetermined program for the exit nozzle to stop at different positions for different durations.

The line mixer used in this invention is a Kenics type and has inner elements of eight or less than eight. A line mixer with four to eight elements can be more preferably used.

A liquid pigment may be side-fed at the flexible hose right after the line mixer.

The molded artificial marble on the steel belt is cut at a predetermined length and treated for post treatment.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
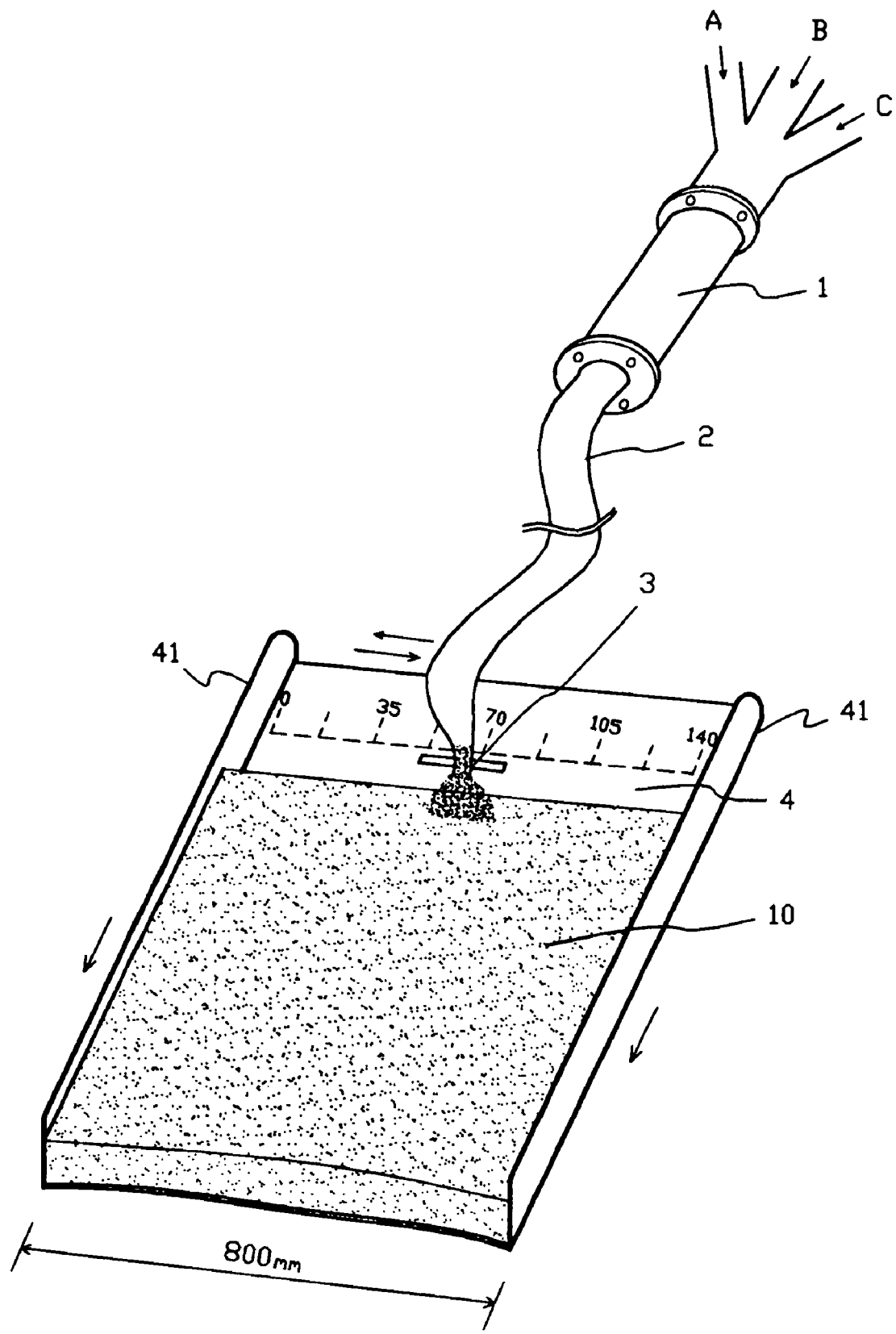
FIG. 1 is a schematic perspective view of the process according to the present invention to prepare acrylic artificial marble with natural pattern and color using at least two liquid resins.
Figure 2:
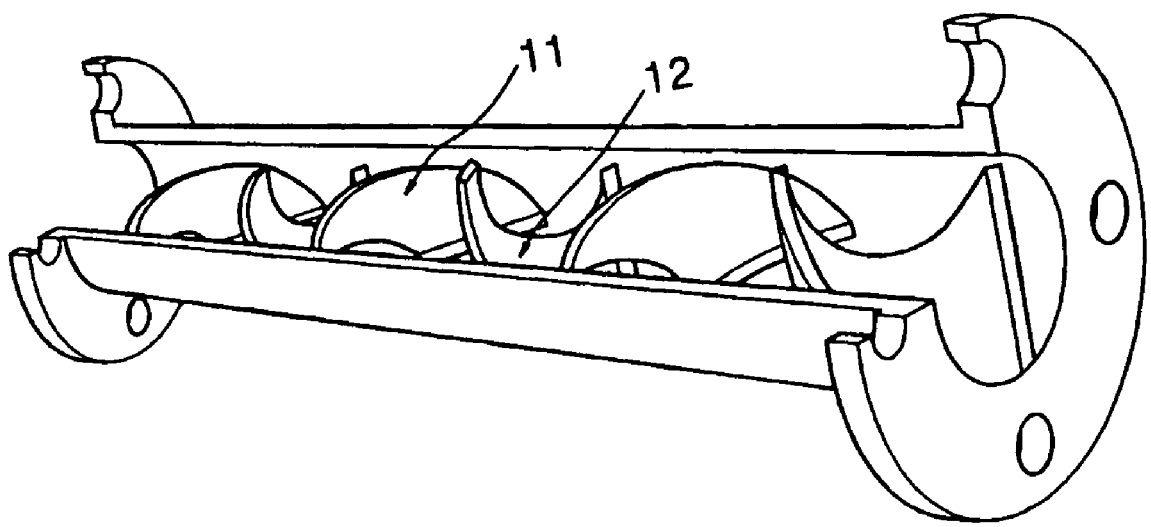
FIG. 2 is a partially sectioned perspective view of the line mixer showing the inner elements.

The present invention relates to a process for preparing acrylic artificial marble having natural pattern and color. FIG. 1 is a schematic perspective view of the process according to the present invention. Although three inlets A, B and C for feeding liquid resin mixtures are shown in FIG. 1, if necessary, two or four liquid resins may be fed, which may be easily carried out by an ordinarily skilled person in the art. The colors of the liquid resins are different each other. At least two liquid resins with different colors are fed into the line mixer 1 to mix ununiformly. The liquid resins are fed into the line mixer with gear pumps separately. FIG. 2 is a partially sectioned perspective view of the line mixer showing the inner elements.

The line mixer used in this invention is a Kenics type and has inner elements of eight or less than eight. As shown in FIG. 2, the line mixer has left-directed element 12 and right-directed element 11 alternately. A line mixer with four to eight elements can be more preferably used. The reason why the number of the elements is limited to eight is to avoid uniform mixing of the liquid resins but to provide ununiform mixing. If the liquid resins are uniformly mixed, uniform pattern and color is obtained, which is far from natural pattern and color. Therefore, it is important to mix the liquid resins ununiformly so as to obtain irregular pattern and color like a natural appearance. To achieve this purpose, the elements of the line mixer should be limited to eight in the present invention, and the line mixer with 4 to 8 elements is preferably used. The liquid resin mixture ununiformly mixed in the line mixer 1 is fed into the flexible hose 2 and exit nozzle 3, and spread on the moving steel belt 4 at a constant speed.

As not shown in FIG. 1, a liquid pigment may be side-fed at the flexible hose right after the line mixer.

The flexible hose 2 is connected to the line mixer 1 at one end and to the exit nozzle 3 at the other end. When the exit nozzle reciprocates perpendicularly to the steel belt 4 by a predetermined program, the flexible hose contributes to partial mixing of the resin mixture.

In the preferred embodiment of the present invention, the steel belt having a width of about 800 mm, the flexible hose may have a diameter of about 60 mm. However, the diameter of the flexible hose may be easily varied by an ordinarily skilled person in the art.

As shown in FIG. 1, the steel belt 4 is for spreading the liquid resin mixture thereon, and forming artificial marble 10. The steel belt rotates at a constant speed. Although the width of the steel belt is 800 mm, the width can be varied on necessary. The steel belt has a constant speed at the range of about 0.2 to 2.0 m/min. The steel belt is equipped with guides 41 at the both sides to prevent the liquid resin spreading out.

The exit nozzle reciprocates perpendicularly to the steel belt by a predetermined program for the exit nozzle. During reciprocation left and right, the exit nozzle stops at plural positions predetermined by a program for predetermined durations. In other words, the exit nozzle stops at different positions for different durations, reciprocating left and right, and discharging continuously the resin mixture on the steel belt. In the preferred embodiment of the present invention, the steel belt having a width of about 800 mm, the flexible hose having a diameter of about 60 mm, the exit nozzle has a diameter of about 20 mm. However, the diameter of the exit nozzle may be easily varied by an ordinarily skilled person in the art.

The exit nozzle moves repeatedly left and right by a robot (not shown) which is also operated by a predetermined program. For example, when the width of the steel belt is scaled from 0 to 140, the exit nozzle is stopped at differently predetermined positions for predetermined durations, thereby varying discharge of the resin mixture on the steel belt. As illustrated in Example 1 below, when the exit nozzle moves from left to right, the exit nozzle stops at the scales of 0, 35, 70, 105 and 140 for 4, 7, 4, 5 and 3 seconds, respectively, discharging continuously the resin mixture on the steel belt. When the exit nozzle moves from right to left, the exit nozzle stops at the scales of 93 and 47 for 9 and 7 seconds, respectively, discharging continuously the resin mixture on the steel belt. In Example 1, the exit nozzle reciprocates 14 times stopping at different positions for different durations. The different positions and durations are predetermined with a software program. The exit nozzle is repeatedly operated. Discharge of the resin mixture on the steel belt at different positions for different durations can provide artificial marble with irregular pattern and color like a natural appearance.

The resin mixture is prepared by adding a filler such as aluminum hydroxide, magnesium hydroxide and calcium hydroxide, a pigment, a curing agent, and a cross-linking agent to a resin syrup of methyl methacrylate (MMA) and polymethyl methacrylate (PMMA). Other additives known for use in artificial marble products can be added to the resin mixture. Such additives include initiating agents, release agents, and dispersing agents.

Examples of the cross-linking agents are ethylene glycol dimethacrylate, t-ethylene glycol dimethacrylate and di-ethylene glycol dimethacrylate. And examples of the curing agents are t-butylperoxy maleic anhydride, benzoyl peroxide and t-butyl hydroperoxide. Examples of pigments are disclosed in U.S. Pat. No. 5,837,175, herein incorporated by reference. White pigments include titanium dioxide and zinc sulfide. Iron oxide having a black color may be used as a black pigment.

The liquid resins to feed into the line mixer have preferably different specific gravities for the purpose of the ununiform mixing. For example, when two liquid resins are used, one liquid resin has preferably a specific gravity of 1.4~1.7 and the other of 0.9~1.5, and when three liquid resins are used, a first liquid resin has preferably a specific gravity of 1.4~1.7, a second of 0.9~1.5, and a third of 1.0~1.6.

For ununiform mixing of the liquid resins, different viscosities may be adopted. The liquid resins used in the present invention have preferably viscosities of about 400~70,000 cps.

As a continuous cast molding method, the process of the present invention prepares artificial marble with natural pattern and color by discharging the resin mixture through the exit nozzle on the steel belt. The artificial marble is formed with a thickness of 15 mm, but the thickness is not limited. The molded artificial marble on the steel belt is cut at a predetermined length and treated for post treatment.

While the present invention has been described with reference to the particular illustrative embodiments, it is not to be restricted by the embodiments.

EXAMPLE 1

Preparation of Liquid Resins A and B: Liquid resin A is prepared by adding aluminum hydroxide, di-ethylene glycol dimethacrylate, t-butyl peroxy maleic acid and white pigment to a resin syrup of methyl methacrylate and polymethyl methacrylate, and agitating the composition. Liquid resin B is prepared in the same manner as liquid resin A except using black pigment instead of white pigment.

Preparation of artificial marble: Liquid resins A and B were fed into a line mixer with six elements, the resin mixture was discharged on the steel belt moving at a speed of 1.0 m/min through a flexible hose and an exit nozzle, and the exit nozzle reciprocated perpendicularly to the steel belt by a predetermined program to stop at different positions for different durations. At the first reciprocation, when the exit nozzle moves from left to right, when the exit nozzle stops at the scales of 0, 35, 70, 105 and 140 for 4, 7, 4, 5 and 3 seconds, respectively, discharging continuously the resin mixture on the steel belt. And then, when the exit nozzle moves from right to left, when the exit nozzle stops at the scales of 93 and 47 for 9 and 7 seconds. The second through fourteenth reciprocations were conducted as predetermined in Table 1, and the fourteen reciprocations were repeated. The different positions and different durations are predetermined by a program and shown in Table 1.

The artificial marble was observed with irregular pattern and color like a natural appearance.

TABLE 1

| No. of Reciprocation | Scales for Stop Positions | Stop Durations (sec) |
|---|---|---|
| 1 | 0/35/70/105/140<br>47/93 | 4/7/4/5/3<br>7/9 |
| 2 | 0/23/46/69/92/115/140<br>35/70/105 | 2/4/3/5/3/4/2<br>8/5/8 |
| 3 | 0/28/56/84/112/140<br>35/70/105 | 3/5/7/4/7/2<br>7/4/8 |
| 4 | 0/47/93/140<br>47/93 | 3/7/8/2<br>7/6 |
| 5 | 0/20/40/60/80/100/120/140<br>35/70/105 | 1/3/2/4/3/5/3/2<br>6/8/7 |
| 6 | 0/35/70/105/140<br>23/46/69/92/115 | 3/5/6/5/3<br>4/5/4/6/4 |
| 7 | 0/47/93/140<br>23/46/69/92/115 | 5/7/5/4<br>1/7/8/7/2 |
| 8 | 0/35/70/105/140<br>47/93 | 5/7/6/7/4<br>7/5 |
| 9 | 0/25/40/65/90/110/140<br>47/93 | 0.5/3/4/5/3/4/0.5<br>5/5 |
| 10 | 0/33/77/111/140<br>45/95 | 4/7/4/5/3<br>7/9 |
| 11 | 0/25/40/65/90/110/140<br>33/77/109 | 2/4/3/5/3/4/2<br>8/5/8 |
| 12 | 0/28/55/88/115/140<br>33/77/115 | 3/5/7/4/7/2<br>7/4/8 |
| 13 | 0/47/98/140<br>40/110 | 3/7/8/2<br>7/6 |
| 14 | 0/15/45/65/80/100/115/140<br>40/77/100 | 1/3/2/4/3/5/3/2<br>6/8/7 |

EXAMPLE 2

Preparation of Liquid Resins A, B and C: Liquid resin A is prepared by adding additives of aluminum hydroxide, diethylene glycol dimethacrylate, t-butyl peroxy maleic acid and white pigment to a resin syrup of methyl methacrylate and polymethyl methacrylate, and agitating the composition. Liquid resin B is prepared in the same manner as liquid resin A except using black pigment instead of white pigment. Liquid resin C is prepared in the same manner as liquid resin A except using brown pigment instead of white pigment.

Preparation of artificial marble: Liquid resins A, B and C were fed into a line mixer with six elements, the resin mixture was discharged on the steel belt moving at a speed of 1.0 m/min through a flexible hose and an exit nozzle, and the exit nozzle reciprocated perpendicularly to the steel belt by a predetermined program to stop at different positions for different durations. At the first reciprocation, when the exit nozzle moves from left to right, when the exit nozzle stops at the scales of 0, 20, 40, 60, 80, 100, 120 and 140 for 0.01, 1.5, 1, 1.5, 1, 1.5, 1 and 0.01 second, respectively, discharging continuously the resin mixture on the steel belt. And then, when the exit nozzle moves from right to left, when the exit nozzle stops at the scales of 11, 92, 69, 46 and 23 for 1, 1.5, 1, 1.5 and 1 second. The second through eighteenth reciprocations were conducted as predetermined in Table 2, and the eighteen reciprocations were repeated. The different positions and different durations are predetermined by a program and shown in Table 2.

The artificial marble was observed with irregular pattern and color like a natural appearance.

TABLE 2

| No. of Reciprocation | Scales for Stop Positions | Stop Durations (sec) |
|---|---|---|
| 1 | 0/20/40/60/80/100/120/140<br>23/46/69/92/115 | 0.01/1.5/1/1.5/1/1.5/1/0.01<br>1/1.5/1/1.5/1 |
| 2 | 0/35/70/105/140<br>35/70/105 | 0.01/1.5/1.0/1.5/0.01<br>1.0/1.5/1.0 |
| 3 | 0/23/46/69/92/115/140<br>28/56/84/112 | 0.01/1.5/1.5/1/1.5/1.5/0.01<br>1/1.5/1.5/1 |
| 4 | 0/17/35/52/70/87/105/122/140<br>23/46/69/92/115 | 0.01/1.5/1.5/1/1.5/1.5/1.5/1/0.01<br>1.5/1/1.5/1/1.5 |
| 5 | 0/28/56/84/112/140<br>14/28/42/56/70/84/98/112/126 | 0.01/1.5/1.5/1.0/1.0/0.01<br>1/1/1/1.5/1.5/1.5/1/1/1 |
| 6 | 0/23/46/69/92/115/140<br>28/56/84/112 | 0.01/1.5/1.5/1/1.5/1.0/0.01<br>1.5/1.0/1.0/1.5 |
| 7 | 0/16/32/48/64/80/96/111/127/140<br>28/56/84/112 | 0.01/1.5/1.5/1/1/1.5/1.5/1/0.01<br>1.5/1/1.5/1 |
| 8 | 0/20/40/60/80/100/120/140<br>28/56/84/112 | 0.01/1.5/1/1.5/1/1.5/1/0.01<br>1.5/1.5/1.5/1 |
| 9 | 0/17/35/52/70/87/105/122/140<br>35/70/105 | 0.01/1/1/1.5/1.5/1/1/1/0.01<br>1.5/1/1.5 |
| 10 | 0/13/26/39/52/65/78/91/104/117/130/140<br>23/46/69/92/115 | 0.01/1/1/1/1.5/1/1.5/1/1/1/0.01<br>1.5/1/1.5/1 |
| 11 | 0/17/35/52/70/87/105/122/140<br>23/46/69/92/115 | 1/1.5/1.5/1/2/2/1.5/1/1<br>1.5/2/1.5/2/1.5 |
| 12 | 0/28/56/84/112/140<br>14/28/42/56/70/84/98/112/126 | 0.5/2.5/2.5/2.0/2.0/0.5<br>1/1/1/2/2/2/1/1/1 |
| 13 | 0/23/46/69/92/115/140<br>28/56/84/112 | 0.5/1.5/1.5/2/2/1.0/0.5<br>1.5/2/2/1.5 |
| 14 | 0/16/32/48/64/80/96/111/127/140<br>28/56/84/112 | 1/2/2/1/1/2/2/1/1<br>2/1/2/1 |
| 15 | 0/20/40/60/80/100/120/140<br>28/56/84/112 | 1/2/1/2/1/2/1/2<br>2/2/1/1 |
| 16 | 0/17/35/52/70/87/105/122/140<br>35/70/105 | 1/2/2/1.5/1.5/2/2/2/1<br>1.5/2/1.5 |
| 17 | 0/13/26/39/52/65/78/91/104/117/130/140<br>23/46/69/92/115 | 1/1/1/1/2/1/2/1/1/1/1<br>2/1/2/1 |
| 18 | 0/20/40/60/80/100/120/140<br>23/46/69/92/115 | 1/2/1/2/1/2/1/2<br>1/2/1/2/1 |

It is to be appreciated that those skilled in the art can change or modify the embodiments without departing from the scope and spirit of the present invention.

What is claimed is:

1. A process for producing acrylic artificial marble with good natural pattern and color consisting essentially of:

mixing ununiformly three liquid resins through a line mixer that has eight or less inner elements to produce an ununiformly mixed resin, wherein any of said liquid resins is prepared by adding a filler selected from the group consisting of aluminum hydroxide, magnesium hydroxide and calcium hydroxide, a pigment, a curing agent, and a cross-linking agent to a resin syrup that includes methyl methacrylate and polymethyl methacrylate, the specific gravity of one liquid resin is about 1.4-1.7, the specific gravity of a second resin is about 0.9-1.5, and the specific gravity of a third resin is about 1.0-1.6, the liquid resins having different viscosities of about 400 cps-70,000 cps, discharging the ununiformly mixed resin through an exit nozzle onto a steel belt moving at a constant speed; and reciprocating the exit nozzle perpendicularly to the steel belt so that the exit nozzle stops at different positions over the steel belt while discharging the mixed resin for different durations onto the steel belt.

* * * * *